United States Patent [19]

Schultz

[11] 4,186,937
[45] Feb. 5, 1980

[54] MOTORCYCLE BACKREST DEVICE

[76] Inventor: Sargent B. Schultz, N168 W16852 Ridgeway Dr., Jackson, Wis. 53037

[21] Appl. No.: 896,453

[22] Filed: Apr. 14, 1978

[51] Int. Cl.$^2$ ............................................. B62J 1/28
[52] U.S. Cl. .............................. 280/289 E; 108/145; 297/383; 297/DIG. 9
[58] Field of Search ................... 280/289 E, 289 R; 297/DIG. 9, 383; 108/145

[56] References Cited
U.S. PATENT DOCUMENTS

| | | | |
|---|---|---|---|
| 1,216,029 | 2/1917 | Whitaker | 297/DIG. 9 |
| 1,922,418 | 8/1933 | Conant | 297/383 X |
| 2,694,872 | 11/1954 | Raduns | 108/145 X |
| 3,203,732 | 8/1965 | Hoffman | 297/383 X |
| 3,549,172 | 12/1970 | McBroom | 297/DIG. 9 |
| 3,822,917 | 7/1974 | George | 297/DIG. 9 |
| 3,899,209 | 8/1975 | Schulz | 297/DIG. 9 |
| 3,913,974 | 10/1975 | Bowen | 297/DIG. 9 |

*Primary Examiner*—John P. Silverstrim
*Attorney, Agent, or Firm*—Horth, Malm & LaFave

[57] ABSTRACT

A backrest device for a motorcycle rider that may be positioned forward to provide a backrest for one rider who is the operator of a motorcycle, and may be swingably repositioned to provide a backrest for a passenger who rides in tandem with the operator on the seat of the motorcycle. The backrest device has a cushioned backrest and a single pair of arms pivotally secured at opposite ends to the backrest and to an upright of a sissy bar. In a forward or extended position, a snubber prevents further backward tilt of the backrest. In a rearward or collapsed position, locking means secures the arms to the upright of the sissy bar.

3 Claims, 5 Drawing Figures

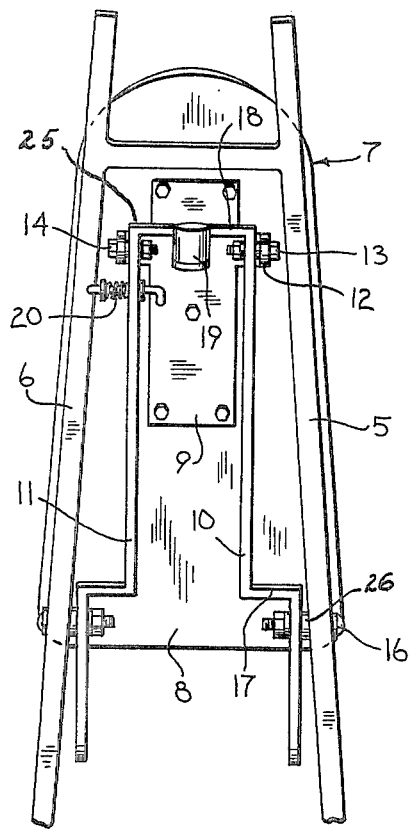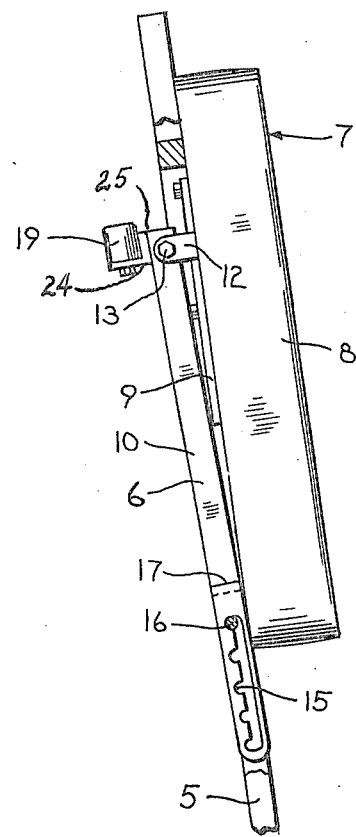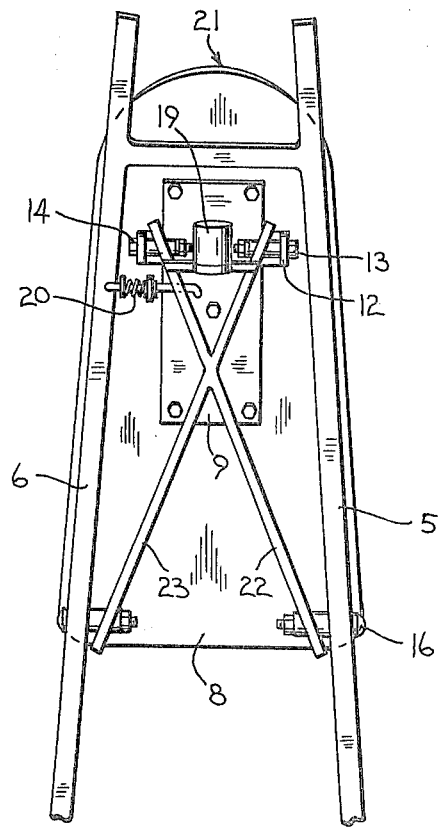

MOTORCYCLE BACKREST DEVICE

SUMMARY OF THE INVENTION

The invention comprises a dual position backrest device normally positioned forwardly to provide a backrest for the operator of a motorcycle when the operator rides alone, and swingable rearwardly to a collapsed position against the upright of a sissy bar to provide a backrest for a passenger who rides in tandem with the operator on a seat of the motorcycle. The construction and arrangement of the backrest device is simple and economical, comprising a backrest and a pair of pivot arms whose free ends are pivotally attached to the upright of the sissy bar, and whose other ends are pivotally attached to the backrest intermediate its top and bottom. In forward or extended position, the backrest rests on the seat of the motorcycle, and rearward inclination is limited by a snubber mounted on the backrest or the arms and abutting one or the other. In such forward position, the arms extend longitudinally of the cycle and transmit any reaction thrust substantially normal to the backrest and to the upright of the sissy bar.

Mounting or removal of the backrest device to a motorcycle having a sissy bar requires only the insertion or removal of the two pivot connections to the sissy bar.

BACKGROUND OF THE INVENTION

Some prior art arrangements for a backrest for the operator or for the passenger riding in tandem on a motorcycle employ sectional seats that may be partially folded or tilted to provide a backrest; some employ a padded luggage carrier that may be pivoted to an inclined position to provide a backrest; some provide a backrest supported by vertically crisscrossing links, one of which is extensible; and none provide a dual position backrest for passenger or rider without complicated apparatus or without requiring adjustments in the apparatus. None employ a backrest selectively swingable to either of two positions with a simple mounting to the vertical uprights of a sissy bar by means of only two laterally spaced pivot connections.

It is, therefore, an object of the present invention to provide a backrest device for use on a motorcycle having a single seat for two riders and a sissy bar to which laterally spaced arms of the backrest device are pivotally connected.

Another object of the invention is that the backrest device can be pivotally folded against the sissy bar to provide a backrest for a tandem riding passenger, or pivotally extended to provide a backrest for an operator.

Other objects and advantages of the backrest device will be apparent on consideration of the following description taken with the accompanying drawings, in which:

FIG. 3 is a back view of the backrest device folded against the sissy bar;

FIG. 4 is a side view of the backrest device folded against the sissy bar; and

FIG. 5 is a view like FIG. 3 but showing a modification of the backrest device.

DESCRIPTION

Figure 1:
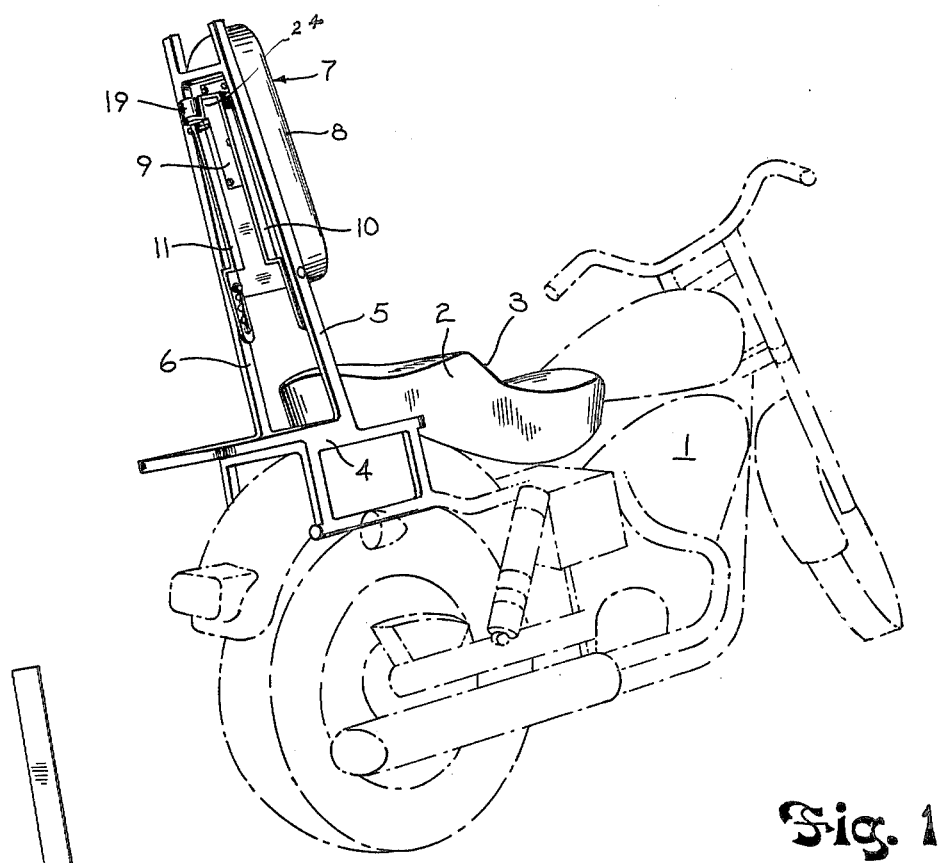
FIG. 1 is a perspective view of a backrest device mounted on a sissy bar of a motorcycle.

Referring to the drawings, the backrest device 7 is for use on a motorcycle 1 having an elongated seat 3 for an operator and a passenger to ride in tandem thereon. The motorcycle 1 has a carriage rack 4 with a sissy bar having vertical, rearwardy inclined frame members 5, 6 which may be formed of flat stock or may be formed of tubular stock. The backrest device is shown pivotally attached to the sissy bar members 5, 6 by mounting means comprising studs 16, shown in each of the figures of the drawing.

The backrest device 7 comprises a padded backrest 8 with a mounting plate 9 secured to the back face thereof which extends sufficiently to provide rigidity to the backrest. The plate 9 has L-shaped flanges 12 on each side, above the midpoint of the backrest. A pair of mounting arms 10, 11 are pivotally secured to the flanges 12 by coupling or stud bolts 13. The mounting arms 10, 11 may be formed, as shown from a single piece of stock to define a U-shaped swing frame having a closed end 25 forming a cross member between the arms 10, 11, and positioned adjacent to the mounting plate 9 of the backrest.

An L-sahped flange 24 is suitably secured to the end 25 of the swing frame, as by welding. A snubber 19, of shock mounting construction, is adjustably secured to the L-shaped flange 24, as best seen in FIG. 4 Snubber 19 serves as an abutment against the mounting plate 9 of the backrest to limit rearward inclination thereof when the backrest device is extended, as shown in FIG. 2.

Figure 2:
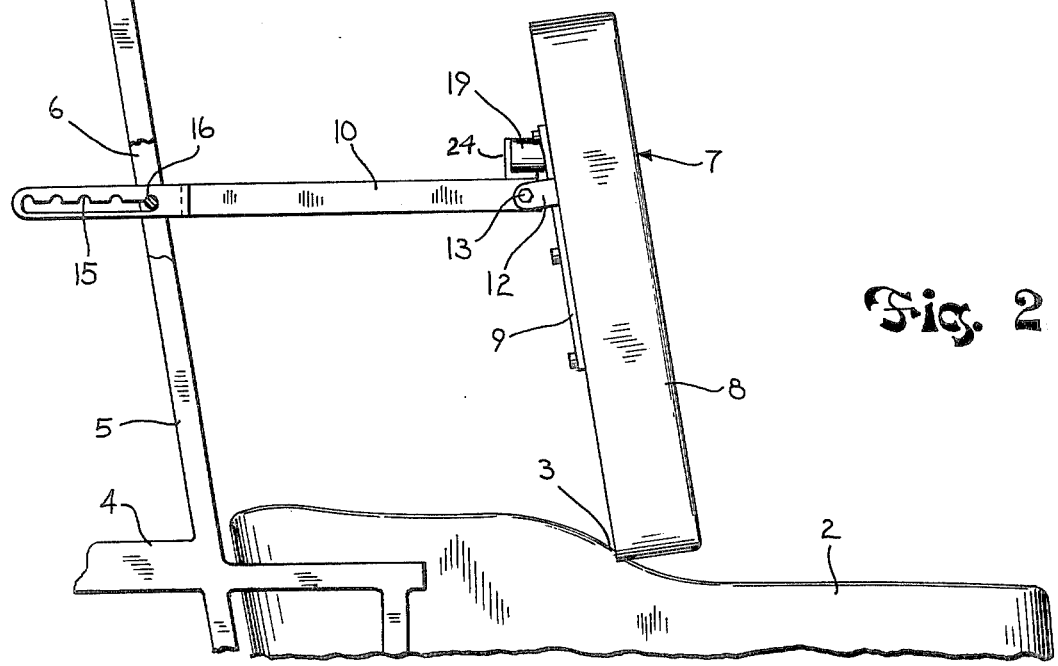
FIG. 2 is a side view of the backrest device shown in extended position attached to the sissy bar of the motorcycle of FIG. 1.

The free ends of the swing arms 10, 11 are suitably pivotally secured to the vertical, spaced apart, upright frame members 5, 6 of the sissy bar, as shown in FIG. 2, in extended position, so that the swing arms are substantially horizontal, and parallel, longitudinally of the motorcycle. The bottom of the backrest abuts the seat 2 at the inclined surface 3 thereof so that in this extended position, the backrest serves the operator.

The pivot mounting means for the swing arms 10, 11 to the sissy bar frame members preferably comprise rubber shock mounts 26 with studs 6 secured to the sissy bar and to the swing arms. The shock mounts provide a space between each sissy bar frame and each swing arm, and one end face of each such spacer is shaped to mate with the surface of the sissy bar frame while holding the axis of the stud horizontal. Thus, the other face of the shock mount spacer provides a flat vertical face in the plane of swing movement of the swing arms 10, 11, respectively.

The sissy bar frame members 5, 6 may be of flat stock, as illustrated, or of round stock, and the spacers are formed to accommodate the inclination and the surfaces thereof. Where the surface of members 5, 6 are flat, the mounting spacers 26 each have one end face inclined with respect to its axis so the axis thereof and of the mounting stud 6 will be horizontal. The opposite end faces of the mounting spacers are normal to their axes and thus in the plane of swing movement of the swing arms 10, 11. For round stock sissy bar frame members 5, 6, the mounting spacers 26 are also concave shaped to mate therewith, and their surfaces inclined to accommodate the lateral inclination of the frame members 5, 6, so that the axes of the mounting spacers 26, and of the mounting studs 16 are horizontal. The opposite ends of the mounting spacers 26 are flat to abut the swing arms 10, 11 and permit pivot movement thereagainst.

In the rearward position of the backrest device, that is, folded against the uprights of the sissy bar, a spring loaded latch or back means 20 mounted on swing arm 11, has a finger member that abuts the back side of sissy bar frame members 6.

FIG. 5 shows a modification of the swing arms to form an "X" frame comprising arms 22, 23 with suitable accommodating mounting spacers secured by stud bolts 16 and lock nuts. The ends of these crisscrossing swing arms 22, 23 may also be bent to form a dog leg for the points of pivot mounting.

The dual position backrest device as illustrated and described may be modified within the teaching provided by the specifications without departing from the invention defined by the claims.

I claim:

1. In a cycle having an elongated seat for accomodating both an operator and a passenger in a tandem relationship and a sissy bar carriage structure including a pair of upright frame members that are inclined rearwardly and toward each other, the improvement comprising a backrest device including a backing plate, a padded backrest secured to said backing plate and means for selectively positioning said backrest and backing plate between a first position adjacent said frame members for accomodating the back of said passenger and a second position longitudinally spaced from said frame members for accomodating the back of said operator in the absence of said passenger, said selectively positioning means comprising: a pair of laterally spaced flanges mounted on said backing plate; a horizontally positioned pivot stud on each of said flanges; a pair of laterally spaced swing arms, a first end of each of said arms being pivotally mounted on one said pivot stud respectively; a horizontally positioned pivot stud on each of said upright frame members, the other end of each of said arms being pivotally mounted on one said upright frame member pivot stud respectively whereby said backrest pivots relative to said arms in a first direction as said backrest moves from said first to said second position; snubber stop means interconnecting said arms, abutment of said stop means with said backing plate in said second position preventing further pivotal movement of said backrest in said first direction and engagement of said backrest with said seat in said second position preventing further pivotal movement of said backrest in a direction opposite to said first direction; and means for latching one of said arms to one of said upright frame members when said backrest is in said first position.

2. The invention as defined in claim 1 in which each upright frame member pivot stud has a spacer mounted thereon having one end face inclined with respect to its axis for mating abutment with the upright frame member to accomodate the inclination of the upright frame member with resect to said upright frame member stud.

3. In a cycle having an elongated seat for accomodating both an operator and a passenger in a tandem relationship and a sissy bar carriage structure including a pair of upright frame members that are inclined rearwardly and toward each other, the improvement comprising a backrest device including a backing plate, a padded backrest secured to said backing plate and means for selectively positioning said backrest and backing plate between a first position adjacent said frame members for accomodating the back of said passenger and a second position longitudinally spaced from said frame members for accomodating the back of said operator in the absence of said passenger said selectively positioning means comprising: a pair of laterally spaced flanges mounted on said backing plate; a horizontally positioned pivot stud on each of said flanges; an X-frame contiguration of swing arms, a first end of each of said arms being pivotally mounted on one said pivot stud respectively, spacers having inclined end faces and mounted on said first pivot stud; a horizontally positioned pivot stud on each of said upright frame members, the other end of each of said arms being pivotally mounted on one said upright frame member pivot stud respectively whereby said backrest pivots relative to said arms in a first direction as said backrest moves from said first to said second position, spacer having inclined end faces also mounted on said upright frame member pivot stud; snubber stop means interconnecting said arms, abutment of said stop means with said backing plate in said second position preventing further pivotal movement of said backrest in said first direction and engagement of said backrest with said seat in said second position preventing further pivotal movement of said backrest in a direction opposite to said first direction; and means for latching one of said arms to one of said upright frame members when said backrest is in said first position.

* * * * *